US012769460B2

(12) United States Patent
Buch et al.

(10) Patent No.: US 12,769,460 B2
(45) **Date of Patent: *Oct. 20, 2026**

(54) TWO-STAGE EMERGENCY DATA STORING OPERATION

(71) Applicant: Micron Technology, Inc., Boise, ID (US)

(72) Inventors: Steffen Buch, Taufkirchen (DE); Marco Redaelli, Munich (DE)

(73) Assignee: Micron Technology, Inc., Boise, ID (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/217,243

(22) Filed: May 23, 2025

(65) Prior Publication Data

US 2025/0284409 A1 Sep. 11, 2025

Related U.S. Application Data

(63) Continuation of application No. 18/511,446, filed on Nov. 16, 2023, now Pat. No. 12,314,573.

(60) Provisional application No. 63/385,434, filed on Nov. 30, 2022.

(51) Int. Cl.
*G06F 3/06* (2006.01)

(52) U.S. Cl.
CPC .......... *G06F 3/0619* (2013.01); *G06F 3/0634* (2013.01); *G06F 3/0659* (2013.01); *G06F 3/0673* (2013.01)

(58) Field of Classification Search
CPC ........ G06F 1/30; G06F 1/3203; G06F 1/3228; G06F 1/329; G06F 1/28
See application file for complete search history.

(56) References Cited

U.S. PATENT DOCUMENTS

| | | | | |
|---|---|---|---|---|
| 5,899,933 | A | 5/1999 | Bhadra et al. | |
| 10,019,162 | B2 * | 7/2018 | Lee | G06F 3/0604 |
| 11,144,221 | B1 | 10/2021 | Lathrop et al. | |
| 11,461,226 | B2 | 10/2022 | Yang | |
| 2012/0089854 | A1 | 4/2012 | Breakstone et al. | |
| 2014/0281151 | A1 | 9/2014 | Yu et al. | |
| 2015/0309952 | A1 | 10/2015 | Breakstone et al. | |
| 2017/0047124 | A1 * | 2/2017 | Ellis | G06F 3/0637 |
| 2018/0329818 | A1 | 11/2018 | Cheng et al. | |
| 2020/0117369 | A1 | 4/2020 | Pelster et al. | |
| 2020/0210079 | A1 | 7/2020 | Cho et al. | |

(Continued)

*Primary Examiner* — Khoa D Doan
(74) *Attorney, Agent, or Firm* — Harrity & Harrity, LLP

(57) ABSTRACT

Implementations described herein relate to a two-stage emergency data storing operation. In some implementations, a memory device may detect a power loss notification signal that indicates a power loss condition of the memory device. The memory device may read a mode register bit of the memory device that indicates to perform a data storing operation that includes a first data storing stage and a second data storing stage. The first data storing stage may include storing data associated with the memory device prior to the memory device experiencing a power loss, and the second data storing stage may include storing data and metadata associated with the memory device prior to the memory device experiencing the power loss. The memory device may initiate the data storing operation and may selectively acknowledge the power loss condition based on completing the first data storing stage or the second data storing stage.

20 Claims, 7 Drawing Sheets

(56) References Cited

U.S. PATENT DOCUMENTS

| | | | |
|---|---|---|---|
| 2021/0141433 | A1 | 5/2021 | Watt |
| 2021/0349780 | A1 * | 11/2021 | Ki ........................ G06F 11/1092 |
| 2022/0035552 | A1 * | 2/2022 | Jain ........................ G06F 3/0647 |
| 2024/0176507 | A1 | 5/2024 | Buch et al. |

* cited by examiner

TWO-STAGE EMERGENCY DATA STORING OPERATION

CROSS-REFERENCE TO RELATED APPLICATIONS

This application is a continuation of U.S. patent application Ser. No. 18/511,446, filed Nov. 16, 2023 (now U.S. Pat. No. 12,314,573), which claims priority to U.S. Provisional Patent Application No. 63/385,434, filed on Nov. 30, 2022, entitled "TWO-STAGE EMERGENCY DATA STORING OPERATION," and assigned to the assignee hereof. The contents of the above-referenced applications are incorporated herein by reference in their entireties.

TECHNICAL FIELD

The present disclosure generally relates to memory devices, memory device operations, and, for example, to a two-stage emergency data storing operation.

BACKGROUND

Memory devices are widely used to store information in various electronic devices. A memory device includes memory cells. A memory cell is an electronic circuit capable of being programmed to a data state of two or more data states. For example, a memory cell may be programmed to a data state that represents a single binary value, often denoted by a binary "1" or a binary "0." As another example, a memory cell may be programmed to a data state that represents a fractional value (e.g., 0.5, 1.5, or the like). To store information, an electronic device may write to, or program, a set of memory cells. To access the stored information, the electronic device may read, or sense, the stored state from the set of memory cells.

Various types of memory devices exist, including random access memory (RAM), read only memory (ROM), dynamic RAM (DRAM), static RAM (SRAM), synchronous dynamic RAM (SDRAM), ferroelectric RAM (FeRAM), magnetic RAM (MRAM), resistive RAM (RRAM), holographic RAM (HRAM), flash memory (e.g., NAND memory and NOR memory), and others. A memory device may be volatile or non-volatile. Non-volatile memory (e.g., flash memory) can store data for extended periods of time even in the absence of an external power source. Volatile memory (e.g., DRAM) may lose stored data over time unless the volatile memory is refreshed by a power source.

DETAILED DESCRIPTION

Figure 1:
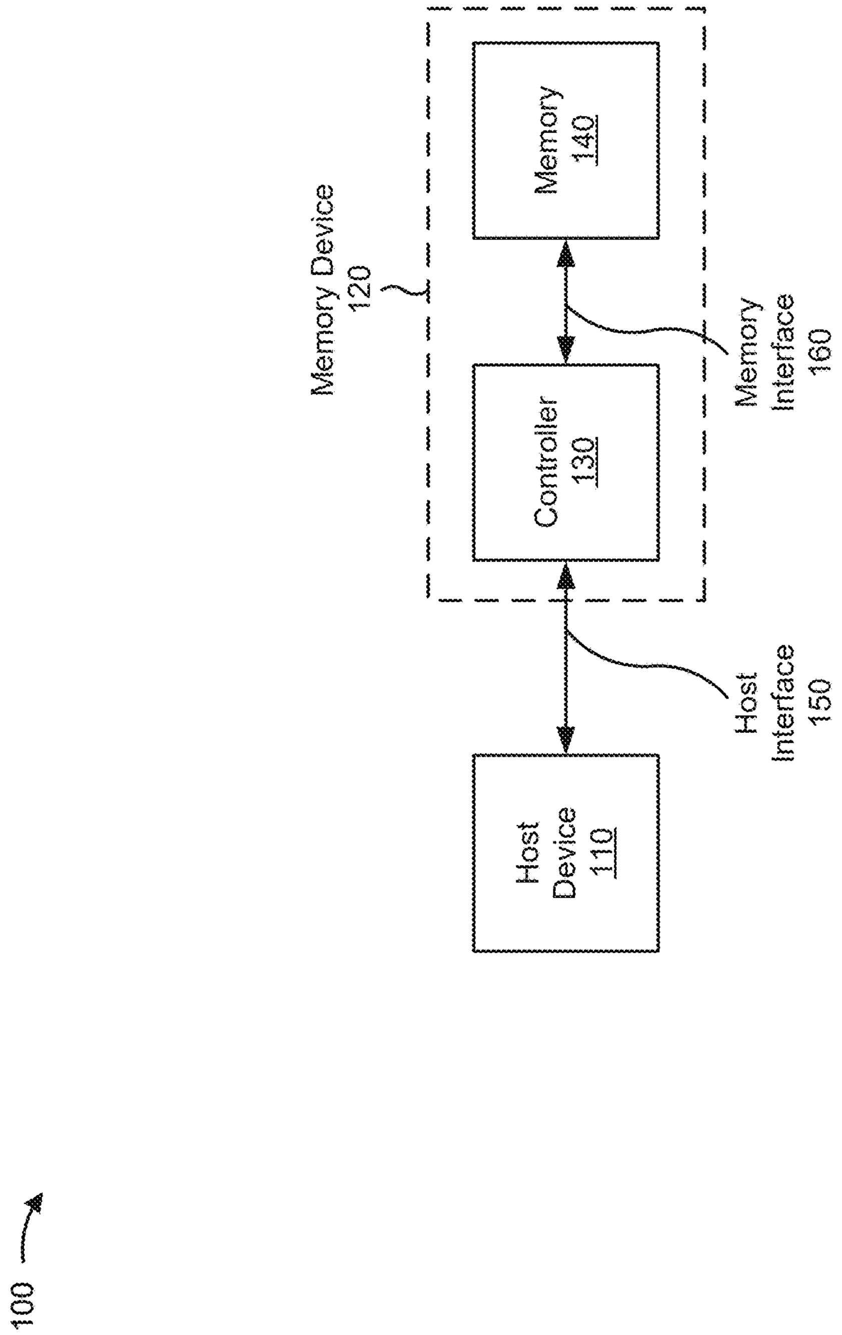
FIG. 1 is a diagram illustrating an example system capable of emergency data storing operation selection.

A memory device may experience a low battery condition and/or a power loss condition. The low battery condition of the memory device may occur when a battery that is providing power to the memory device is in a low power state. For example, a cellular phone may include a memory device and a battery that provides power to the memory device. The memory device may experience a low battery condition when a charge of the battery is less than a threshold, such as less than ten percent, less than five percent, or less than two percent, among other examples. The power loss condition of the memory device may occur when the charge of the battery is zero percent or close to zero percent. For example, a memory device that is experiencing a low battery condition may experience a power loss condition if the battery that is powering the memory device (and/or other components) continues to be used. Alternatively, the power loss condition may occur when the battery becomes disconnected from the memory device. For example, when a vehicle that includes a battery and a memory device crashes, the battery may become disconnected from the memory device, and the memory device may no longer receive power from the battery.

A memory device experiencing the low battery condition or the power loss condition may perform an emergency storing operation to prevent data loss. In some cases, the emergency storing operation may be an emergency power fail (EPF) operation. In this case, the memory device may store data (such as in-flight data) prior to a power loss acknowledgement (PLA) signal being asserted, but may not store metadata (such as logical block address (LBA) information) prior to the PLA being asserted. This may require a longer boot-up time during a next powering on of the memory device, for example, to enable the memory device to recover the metadata. In some cases, the emergency storing operation may a forced quiescence (FQ) operation. In this case, the memory device may store both data and metadata prior to the PLA being asserted, and the memory device may not need the longer boot-up time at the next powering on of the memory device. The memory device may use power from one or more capacitors associated with the memory device to perform the EPF operation or the FQ operation. In some cases, a register setting may indicate which emergency storing operation is to be used. For example, a first bit of the register may indicate for the memory device to use the EPF operation to store the data prior to a memory device shut-down, and a second bit of the register may indicate for the memory device to use the FQ operation to store the data and the associated metadata prior to the memory device shut-down.

In some cases, it may not be desirable for the memory device to use the EPF operation due to the longer boot-up times associated with the EPF operation, particularly when there is enough time for an FQ operation to be performed. For example, a user of the automobile may not be able to wait a time period for the memory device to recover the metadata upon a next powering on of the memory device prior to being able to drive the automobile. In some cases, protocol level commands may be used to control or manage the emergency storing operations. For example, the system may include a power management integrated circuit (PMIC) triggering a power loss management interrupt routine, a host system-on-chip (SOC) executing an interrupt service routine, and a memory controller serving a non-volatile memory express (NVMe) command associated with the emergency storing operation into a command queue. This may result in additional delays for the memory device with respect to storing the data and/or the metadata. In some cases, a design architecture of the PMIC may result in the host SOC being powered off during an APL to maximize a power hold-off time for preventing data corruption. However, there is currently no method that enables the memory device to control (e.g., using hardware signals) which emergency storing operation is to be performed based on a low battery condition or a power loss condition, such as based on detection of a power loss notification (PLN) signal.

In some implementations, the memory device may perform (or attempt to perform) both the EPF operation and the FQ operation during an emergency storing operation. The memory device may detect a PLN signal that indicates a power loss condition or a low battery condition of the memory device. The memory device may read a mode register bit of the memory device that indicates to perform a data storing operation that includes the EPF operation and the FQ operation. The memory device may initiate the data storing operation that includes the EPF operation and the FQ operation based on detecting the PLN signal and based on the register bit indicating to perform the data storing operation that includes the EPF operation and the FQ operation. For example, the memory device may initiate the EPF operation to store data associated with the memory device prior to the memory device experiencing a power loss. If the memory device completes the EPF operation, the memory device may proceed to perform the FQ operation. As a result, the memory device may perform the EPF operation to save data prior to the memory device experiencing the power loss, and may continue to perform the FQ operation upon completion of the EPF operation. This may enable the memory device to store data and metadata prior to the memory device experiencing a power loss, thereby preventing a longer a boot-up time during a next powering on of the memory device. Additional details are described herein.

FIG. 1 is a diagram illustrating an example system 100 capable of emergency data storing operation selection. The system 100 may include one or more devices, apparatuses, and/or components for performing operations described herein. For example, the system 100 may include a host device 110 and a memory device 120. The memory device 120 may include a controller 130 and memory 140. The host device 110 may communicate with the memory device 120 (e.g., the controller 130 of the memory device 120) via a host interface 150. The controller 130 and the memory 140 may communicate via a memory interface 160.

The system 100 may be any electronic device configured to store data in memory. For example, the system 100 may be a computer, a mobile phone, a wired or wireless communication device, a network device, a server, a device in a data center, a device in a cloud computing environment, a vehicle (e.g., an automobile or an airplane), and/or an Internet of Things (IoT) device. The host device 110 may include one or more processors configured to execute instructions and store data in the memory 140. For example, the host device 110 may include a central processing unit (CPU), a graphics processing unit (GPU), a field-programmable gate array (FPGA), an application-specific integrated circuit (ASIC), and/or another type of processing component.

The memory device 120 may be any electronic device configured to store data in memory. In some implementations, the memory device 120 may be an electronic device configured to store data temporarily in volatile memory. For example, the memory device 120 may be a random-access memory (RAM) device, such as a dynamic RAM (DRAM) device or a static RAM (SRAM) device. In this case, the memory 140 may include volatile memory that requires power to maintain stored data and that loses stored data after the memory device 120 is powered off. For example, the memory 140 may include one or more latches and/or RAM, such as DRAM and/or SRAM. In some implementations, the memory 140 may include non-volatile memory configured to maintain stored data after the memory device 120 is powered off, such as NAND memory or NOR memory. For example, the non-volatile memory may store persistent firmware or other instructions for execution by the controller 130.

The controller 130 may be any device configured to communicate with the host device (e.g., via the host interface 150) and the memory 140 (e.g., via the memory interface 160). Additionally, or alternatively, the controller 130 may be configured to control operations of the memory device 120 and/or the memory 140. For example, the controller 130 may include a memory controller, a system controller, an ASIC, an FPGA, a processor, a microcontroller, and/or one or more processing components. In some implementations, the controller 130 may be a high-level controller, which may communicate directly with the host device 110 and may instruct one or more low-level controllers regarding memory operations to be performed in connection with the memory 140. In some implementations, the controller 130 may be a low-level controller, which may receive instructions regarding memory operations from a high-level controller that interfaces directly with the host device 110. As an example, a high-level controller may be an SSD controller, and a low-level controller may be a non-volatile memory controller (e.g., a NAND controller) or a volatile memory controller (e.g., a DRAM controller). In some implementations, a set of operations described herein as being performed by the controller 130 may be performed by a single controller (e.g., the entire set of operations may be performed by a single high-level controller or a single low-level controller). Alternatively, a set of operations described herein as being performed by the controller 130 may be performed by more than one controller (e.g., a first subset of the operations may be performed by a high-level controller and a second subset of the operations may be performed by a low-level controller).

The host interface 150 enables communication between the host device 110 and the memory device 120. The host interface 150 may include, for example, a Small Computer System Interface (SCSI), a Serial-Attached SCSI (SAS), a Serial Advanced Technology Attachment (SATA) interface, a Peripheral Component Interconnect Express (PCIe) interface, an NVMe interface, a USB interface, a Universal Flash Storage (UFS) interface, and/or an embedded multimedia card (eMMC) interface.

The memory interface 160 enables communication between the memory device 120 and the memory 140. The memory interface 160 may include a non-volatile memory interface (e.g., for communicating with non-volatile memory), such as a NAND interface or a NOR interface. Additionally, or alternatively, the memory interface 160 may include a volatile memory interface (e.g., for communicating with volatile memory), such as a double data rate (DDR) interface.

In some implementations, the memory device 120 and/or the controller 130 may be configured to detect a power loss notification signal that indicates a power loss condition of the memory device; read a mode register bit of the memory device that indicates to perform a data storing operation that includes a first data storing stage and a second data storing stage, wherein the first data storing stage includes storing data associated with the memory device prior to the memory device experiencing a power loss, and the second data storing stage includes storing data and metadata associated with the memory device prior to the memory device experiencing the power loss; initiate the data storing operation; and selectively acknowledge the power loss condition based on completing the first data storing stage or the second data storing stage.

In some implementations, the memory device 120 and/or the controller 130 may be configured to a power management component configured to: detect a power loss condition associated with a memory device; and transmit a power loss notification signal to the memory device that indicates the power loss condition; and the memory device, wherein the memory device is configured to: receive the power loss notification signal; read a mode register bit of the memory device that indicates to perform a data storing operation that includes a first data storing stage and a second data storing stage, wherein the first data storing stage includes storing data associated with the memory device prior to the memory device experiencing a power loss, and the second data storing stage includes storing data and metadata associated with the memory device prior to the memory device experiencing the power loss; initiate the data storing operation; and selectively acknowledge the power loss condition based on completing the first data storing stage or the second data storing stage.

In some implementations, the memory device 120 and/or the controller 130 may be configured to detect a power loss condition of the memory device; read a mode register bit that indicates to perform a data storing operation that includes an emergency power fail operation and a forced quiescence operation; initiate and completing the emergency power fail operation; initiate the forced quiescence operation based on completing the emergency power fail operation; and assert a power loss acknowledgement based on completing the forced quiescence operation.

As indicated above, FIG. 1 is provided as an example. Other examples may differ from what is described with regard to FIG. 1.

Figure 2:
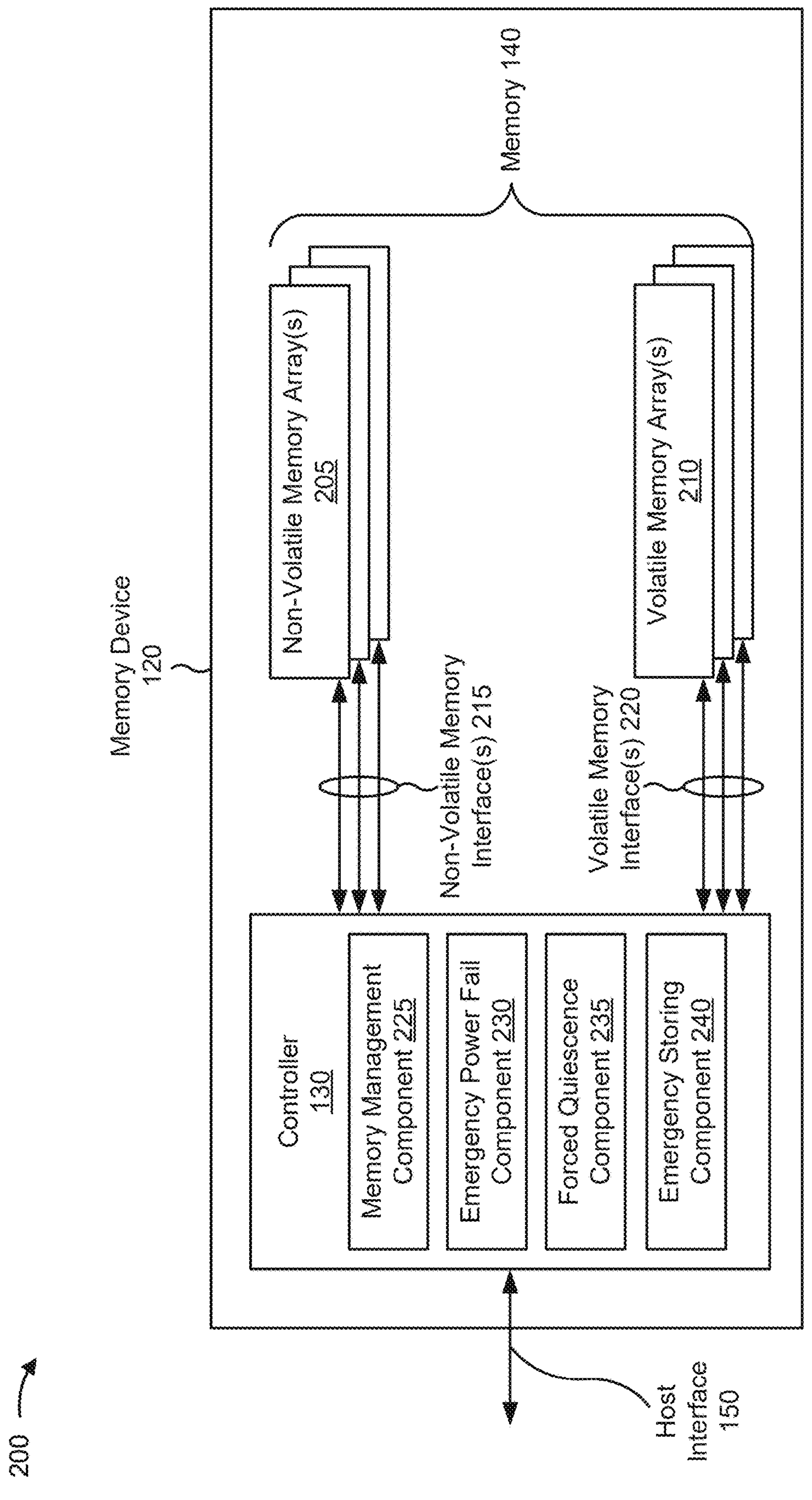
FIG. 2 is a diagram of example components included in a memory device.

FIG. 2 is a diagram of example 200 components included in a memory device 120. As described above in connection with FIG. 1, the memory device 120 may include a controller 130 and memory 140. As shown in FIG. 2, the memory 140 may include one or more non-volatile memory arrays 205, such as one or more NAND memory arrays and/or one or more NOR memory arrays. Additionally, or alternatively, the memory 140 may include one or more volatile memory arrays 210, such as one or more SRAM arrays and/or one or more DRAM arrays. The controller 130 may transmit signals to and receive signals from a non-volatile memory array 205 using a non-volatile memory interface 215. The controller 130 may transmit signals to and receive signals from a volatile memory array 210 using a volatile memory interface 220.

The controller 130 may control operations of the memory 140, such as by executing one or more instructions. For example, the memory device 120 may store one or more instructions in the memory 140 as firmware, and the controller 130 may execute those one or more instructions. Additionally, or alternatively, the controller 130 may receive one or more instructions from the host device 110 via the host interface 150, and may execute those one or more instructions. In some implementations, a non-transitory computer-readable medium (e.g., volatile memory and/or non-volatile memory) may store a set of instructions (e.g., one or more instructions or code) for execution by the controller 130. The controller 130 may execute the set of instructions to perform one or more operations or methods described herein. In some implementations, execution of the set of instructions, by the controller 130, causes the controller 130 and/or the memory device 120 to perform one or more operations or methods described herein. In some implementations, hardwired circuitry is used instead of or in combination with the one or more instructions to perform one or more operations or methods described herein. Additionally, or alternatively, the controller 130 and/or one or more components of the memory device 120 may be configured to perform one or more operations or methods described herein. An instruction is sometimes called a "command."

For example, the controller 130 may transmit signals to and/or receive signals from the memory 140 based on the one or more instructions, such as to transfer data to (e.g., write or program), to transfer data from (e.g., read), and/or to erase all or a portion of the memory 140 (e.g., one or more memory cells, pages, sub-blocks, blocks, or planes of the memory 140). Additionally, or alternatively, the controller 130 may be configured to control access to the memory 140 and/or to provide a translation layer between the host device 110 and the memory 140 (e.g., for mapping logical addresses to physical addresses of a memory array). In some implementations, the controller 130 may translate a host interface command (e.g., a command received from the host device 110) into a memory interface command (e.g., a command for performing an operation on a memory array).

As shown in FIG. 2, the controller 130 may include a memory management component 225, an EPF component 230, an FQ component 235, and/or an emergency storing component 240. In some implementations, one or more of these components are implemented as one or more instructions (e.g., firmware) executed by the controller 130. Alternatively, one or more of these components may be implemented as dedicated integrated circuits distinct from the controller 130.

The memory management component 225 may be configured to manage performance of the memory device 120. For example, the memory management component 225 may perform wear leveling, bad block management, block retirement, read disturb management, and/or other memory management operations. In some implementations, the memory device 120 may store (e.g., in memory 140) one or more memory management tables. A memory management table may store information that may be used by or updated by the memory management component 225, such as information regarding memory block age, memory block erase count, and/or error information associated with a memory partition (e.g., a memory cell, a row of memory, a block of memory, or the like).

The EPF component 230 may be configured to perform a first emergency storing operation such as an EPF operation. The EPF operation may include storing memory device data such as in-flight memory device data. The EPF operation may not include storing memory device metadata, or may include storing only a portion of the memory device metadata. The EPF operation may include storing the data prior to the memory device 120 experiencing a power loss (e.g., prior to the memory device being powered down). Additionally, or alternatively, the EPF operation may include storing the data prior to the memory device 120 asserting a PLA signal. The EPF operation may result in a longer boot-up time during a next powering on of the memory device 120. For example, the memory device 120 may need to store and/or manage the metadata in the memory device 120 prior to the memory device 120 being available for use.

The FQ component 235 may be configured to perform a second emergency storing operation such as an FQ operation. The FQ operation may include storing memory device data (such as in-flight data) and memory device metadata. The FQ operation may include storing the data and the metadata prior to the memory device experiencing a power loss (e.g., prior to the memory device being powered down). Additionally, or alternatively, the FQ operation may include storing the data and the metadata prior to the memory device 120 asserting a PLA signal. The FQ operation may result in a normal boot-up time the next time the memory device is powered on. For example, the memory device 120 may not need to store and/or manage the metadata in the memory device 120 prior to the memory device being available for use.

The emergency storing component 240 may be configured to store memory device data (and/or metadata) based on the memory device 120 performing the EPF operation, the FQ operation, or both the EPF operation and the FQ operation. In some implementations, the emergency storing component 240 may determine whether the memory device 120 is to perform the EPF operation, the FQ operation, or both the EPF operation and the FQ operation based on one or more inputs, such as an EPF input, a PLN input, and a PERST input. In some other implementations, the emergency storing component 240 may perform (or attempt to perform) both the EPF operation and the FQ operation.

One or more devices or components shown in FIG. 2 may be configured to perform operations described elsewhere herein, such as one or more operations and/or methods described in connection with FIGS. 4, 5A and 5B. For example, the controller 130, the memory management component 225, the EPF component 230, the FQ component 235, and/or the emergency storing component 240 may be configured to perform one or more operations and/or methods for the memory device 120.

The number and arrangement of components shown in FIG. 2 are provided as an example. In practice, there may be additional components, fewer components, different components, or differently arranged components than those shown in FIG. 2. Furthermore, two or more components shown in FIG. 2 may be implemented within a single component, or a single component shown in FIG. 2 may be implemented as multiple, distributed components. Additionally, or alternatively, a set of components (e.g., one or more components) shown in FIG. 2 may perform one or more operations described as being performed by another set of components shown in FIG. 2.

Figure 3:
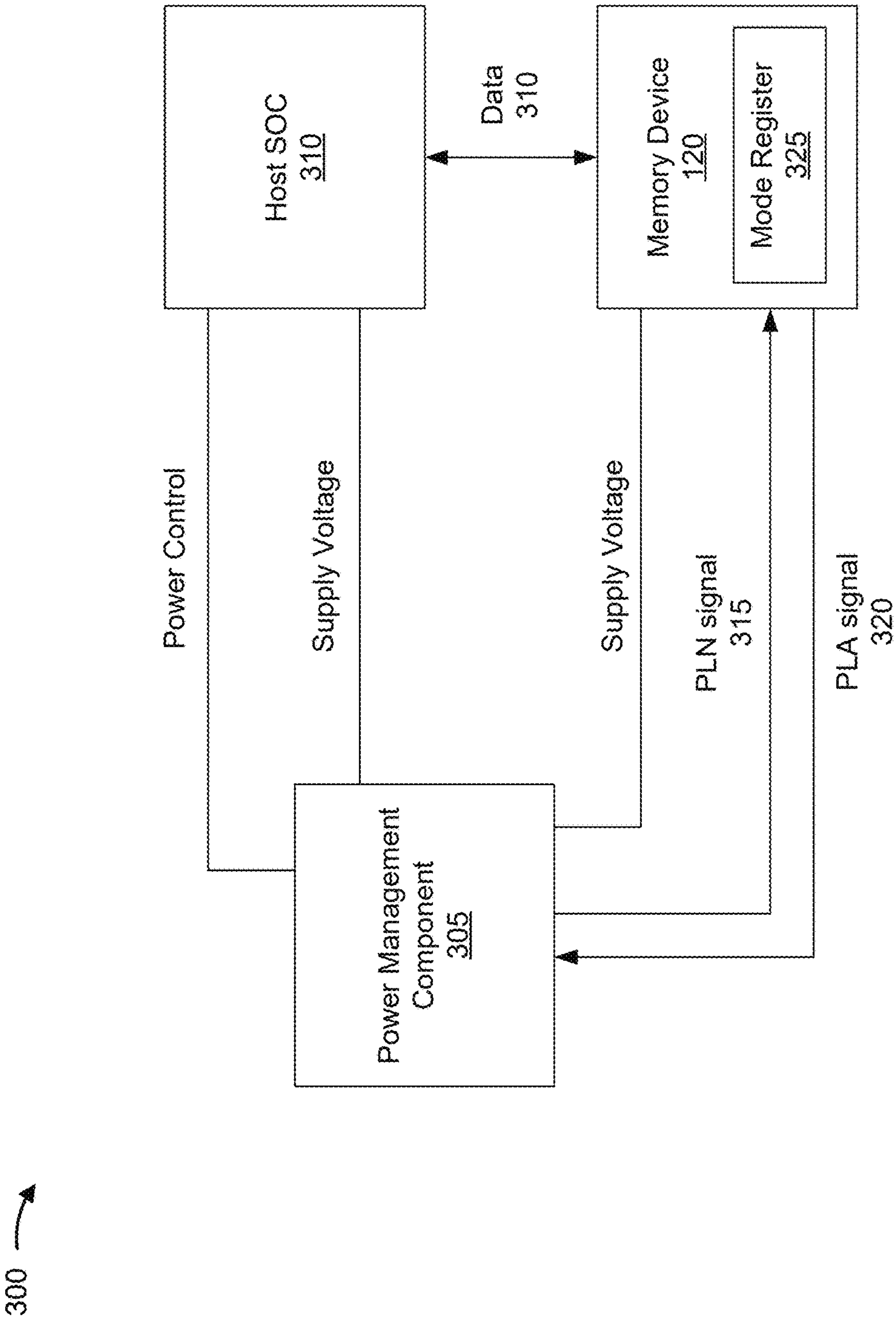
FIG. 3 is a diagram illustrating an example of emergency data storing.

FIG. 3 is a diagram illustrating an example 300 of emergency data storing. A host SOC 310 may write data to the memory device 120 and/or may read data from the memory device 120. A power management component 305 may provide power control to the host SOC 310 and/or may provide a supply voltage to the host SOC 310.

Additionally, or alternatively, the power management component 305 may provide a supply voltage to the memory device 120. In some cases, the power management component 305 may assert a PLN signal 315 to indicate a power loss condition associated with the memory device 120. For example, the power management component 305 may assert the PLN signal 315 based on the memory device 120 experiencing a low battery condition or a disconnected battery condition. In some cases, the memory device 120 may be configured to assert a PLA signal 320. The PLA signal 320 may indicate to the power management component 305 that the memory device 120 has completed an EPF operation or an FQ operation.

In some cases, the memory device 120 may include a mode register 325. The mode register 325 may indicate whether the memory device 120 is to perform the EPF operation or the FQ operation. For example, a first state (such as a low state) may indicate that the memory device 120 is to perform the EPF operation and a second state (such as a high state) may indicate that the memory device 120 is to perform the FQ operation. When the memory device 120 detects the PLN signal 315, the memory device 120 may perform an emergency storing operation based on a status of the mode register 325. For example, the memory device 120 may detect the PLN signal 315 and may perform the EPF operation based on the mode register 325 being in the low state. Alternatively, the memory device 120 may detect the PLN signal 315 and may perform the FQ operation based on the mode register 325 being in the high state. As described herein, the EPF operation may result in a longer boot-up time during a next powering on of the memory device 120.

As indicated above, FIG. 3 is provided as an example. Other examples may differ from what is described with regard to FIG. 3.

Figure 4A:
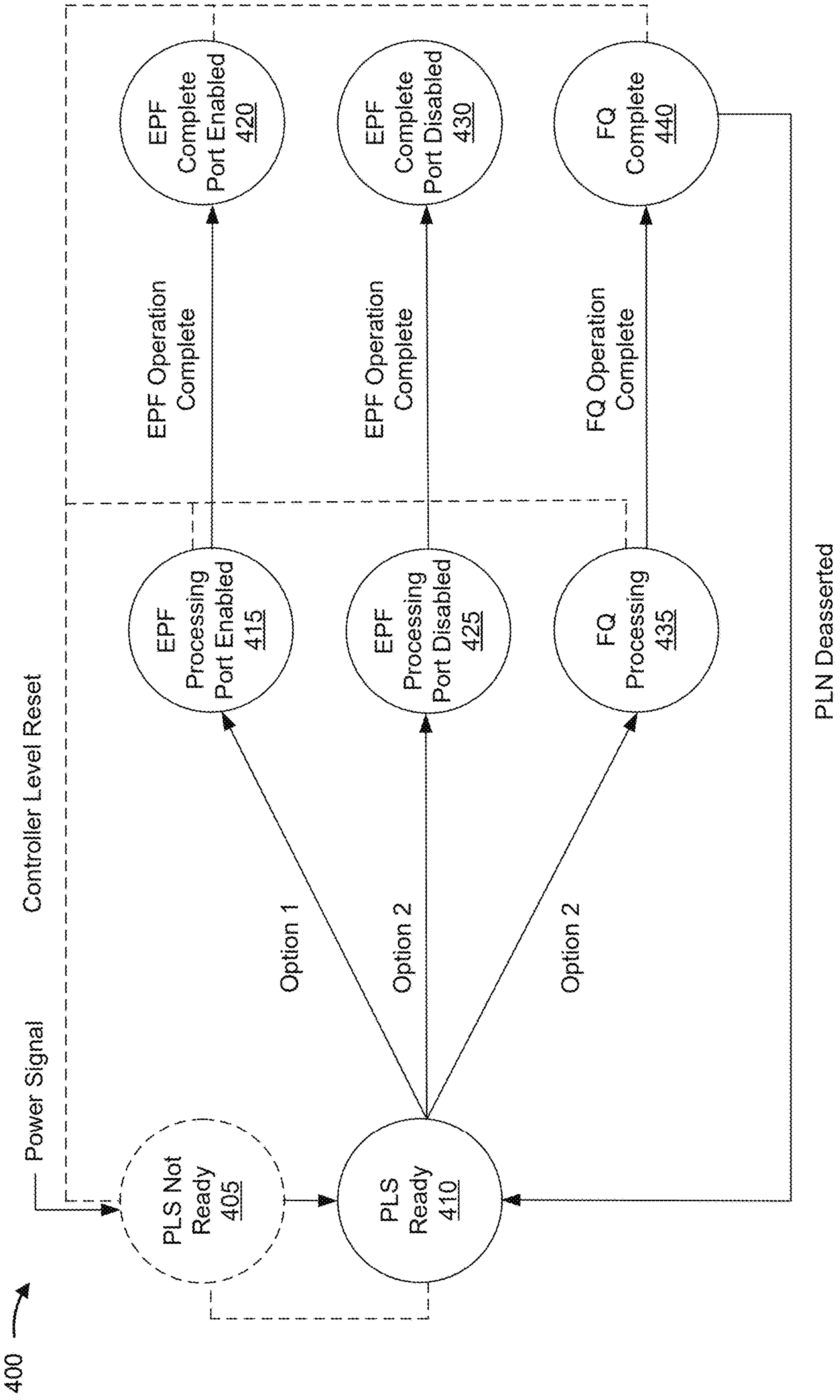
FIGS. 4A and 4B illustrate examples of a two-stage emergency storing operation.
Figure 4B:
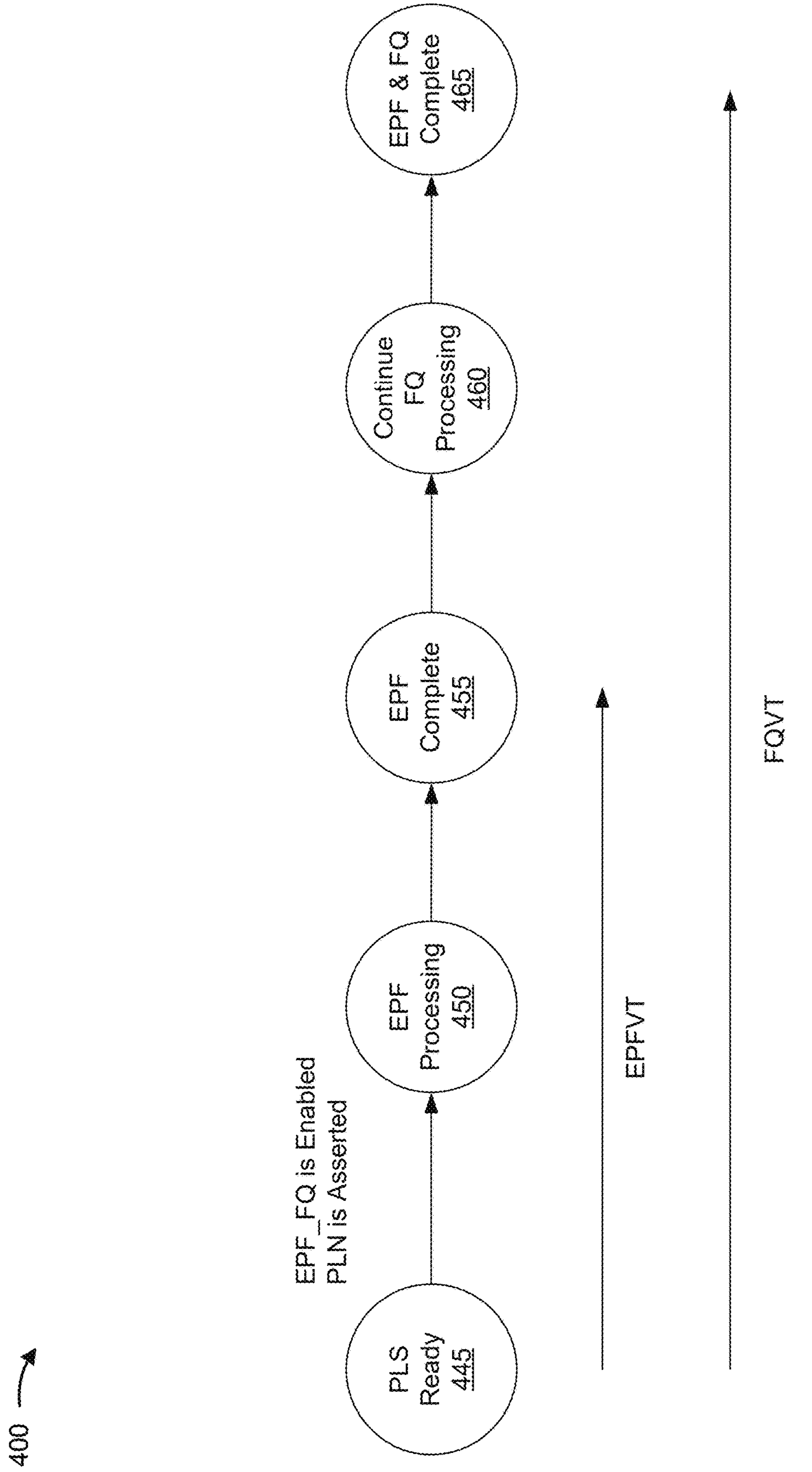

FIGS. 4A and 4B illustrate examples of a two-stage emergency storing operation 400. The two-stage emergency storing operation 400 may be performed by the memory device 120, such as by the controller 130 associated with the memory device 120. A first stage of the two-stage emergency storing operation 400 may include a first data storing operation such as an EPF operation. A second stage of the two-stage emergency storing operation 400 may include a second data storing operation such as an FQ operation. The memory device 120 may receive a power signal. As shown by reference number 405, the power loss signal (PLS) may not be in a ready state. For example, the memory device 120 may not be experiencing a low battery condition or a disconnected battery condition. As shown by reference number 410, the PLS may be in a ready state. For example, the memory device 120 may be experiencing the low battery condition or the disconnected battery condition.

In some cases, as shown in FIG. 4A and by reference number 415, an EPF processing port may be enabled. The EPF processing port may be enabled based on the EPF operation being enabled, the PLN signal being asserted, and the memory device 120 supporting the EPF processing port enabled state (Option 1). The memory device 120 may initiate the EPF operation based on the EPF operation being enabled, the PLN signal being asserted, and the EPF processing port being enabled. As shown by reference number 420, the memory device 120 may complete the EPF operation, and an EPF complete port may be enabled based on the EPF operation being completed. The memory device 120 may perform a controller level reset based on the EPF operation being complete and the EPF complete port being enabled. In some cases, as shown by reference number 425, an EPF processing port may be disabled. The EPF processing port may be disabled based on the EPF operation being enabled, the PLN signal being asserted, and the memory device 120 supporting the EPF processing port disabled state (Option 2). As shown by reference number 430, the memory device 120 may complete the EPF operation, and the EPF complete port may be disabled based on the EPF operation being completed. In this case, the memory device 120 may not perform a controller level reset. In some cases, as shown by reference number 435, FQ processing may be enabled. The FQ processing may be enabled based on the FQ operation being enabled and the PLN signal being asserted (Option 3). As shown by reference number 440, the memory device 120 may complete the FQ operation. The memory device 120 may perform a controller level reset based on the FQ operation being complete. In some cases, the PLN signal may be de-asserted based on the memory device completing the FQ operation.

As described in the preceding paragraph, the EPF operation or the FQ operation may be initiated or performed based on one or more conditions. For example, the EPF operation may be performed based on EPF being enabled, such as based on a register bit indicating for the memory device 120 to perform the EPF operation. Alternatively, the FQ operation may be performed based on the FQ operation being enabled, such as based on the register bit indicating for the memory device 120 to perform the FQ operation.

In some implementations, the memory device 120 may be configured with a second register bit, such as an EPF_FQ bit. When the EPF_FQ bit is in a first state (such as a low state), the memory device 120 may be configured to perform one of the EPF operation or the FQ operation (as described above). For example, the memory device 120 may perform the EPF operation or the FQ operation in accordance with the mode register 325. When the EPF_FQ bit is in a second state (such as a high state), the memory device 120 may be configured to perform a storing operation that includes the EPF operation and the FQ operation.

In some implementations, as shown in FIG. 4B and by reference number 445, the PLS may be in a ready state. The memory device 120 may detect a PLN signal and may determine that an EPF_FQ mode is enabled. As shown by reference number 450, the memory device 120 may initiate EPF processing. For example, the memory device 120 may store data (such as in-flight data) associated with the memory device 120. As shown by reference number 455, the memory device 120 may complete the EPF operation. The memory device 120 may complete the EPF operation prior to a first time, such as an EPF vault time (EPFVT). The memory device 120 may complete the EPF operation based on the memory device data (such as the in-flight memory device data) being stored prior to the expiration of the EPFVT.

As shown by reference number 460, the memory device 120 may perform (e.g., continue) the FQ operation. For example, the memory device 120 may store metadata, such as metadata associated with data that was stored during the EPF operation. The memory device 120 may perform the FQ operation based on a completion of the EPF operation prior to the first time and based on the memory device 120 having enough power to continue with the FQ operation. As shown by reference number 465, the memory device 120 may complete the FQ operation (and the EPF operation). The memory device 120 may complete the FQ operation prior to a second time, such as an FQ vault time (FQVT). The memory device 120 may complete the EPF operation and the FQ operation based on memory device data and memory device metadata being stored in the memory device 120 prior to the expiration of the FQVT.

In some implementations, the memory device 120 may perform the EPF operation and the FQ operation based on detecting a power loss condition. For example, the memory device 120 may receive the PLN signal 315, initiate the EPF processing 450, complete the EPF processing 455, continue the FQ processing 460, and complete the FQ processing 465 based on receiving the PLN signal 315. In some implementations, the memory device 120 may perform the EPF operation and the FQ operation based on a standard shut-down of the memory device 120. For example, the memory device 120 may detect a standard shut-down operation of the memory device 120, may initiate the EPF processing 450, complete the EPF processing 455, continue the FQ processing 460, and complete the FQ processing 465 based on detecting the standard shut-down operation. In some implementations, the memory device 120 may perform the combined saving operation (EPF and FQ) based on the power loss condition and the standard shut-down condition in parallel. For example, the memory device 120 may perform the EPF processing using energy from the capacitors. Thus, in the event of an emergency power fail, the memory device 120 may save critical data prior to experiencing the power loss. In the case of a standard (e.g., regular) shut-down operation, the memory device 120 may receive the PLN signal 315 from the power management component 305 and/or other circuitry. However, in this case, the power may be maintained for the memory device 120 to perform the FQ processing and the EPF processing prior to the power being cut-off. After the PLA is asserted by the memory device 120, the voltages that supply power to the memory device 120 may be cut off, thereby completing the shut-down.

In some implementations, the memory device 120 may perform the EPF operation and the FQ operation based on power received from one or more capacitors, such as the capacitors described in connection with FIG. 6. In some implementations, the memory device 120 may perform a controller level reset based on completing the EPF operation and the FQ operation. In some implementations, the memory device 120 may assert a PLA signal based on completing the EPF operation and the FQ operation. In some implementations, the memory device 120 may de-assert the PLN signal based on completing the EPF operation and the FQ operation. As described herein, the memory device 120 may perform the EPF operation to save data prior to the memory device 120 experiencing the power loss, and may continue to perform the FQ operation upon a completion of the EPF operation. This may enable the memory device 120 to store data and metadata prior to the memory device 120 experiencing a power loss, thereby preventing a longer a boot-up time during a next powering on of the memory device.

As indicated above, FIGS. 4A and 4B are provided as examples. Other examples may differ from what is described with regard to FIGS. 4A and 4B.

Figure 5:
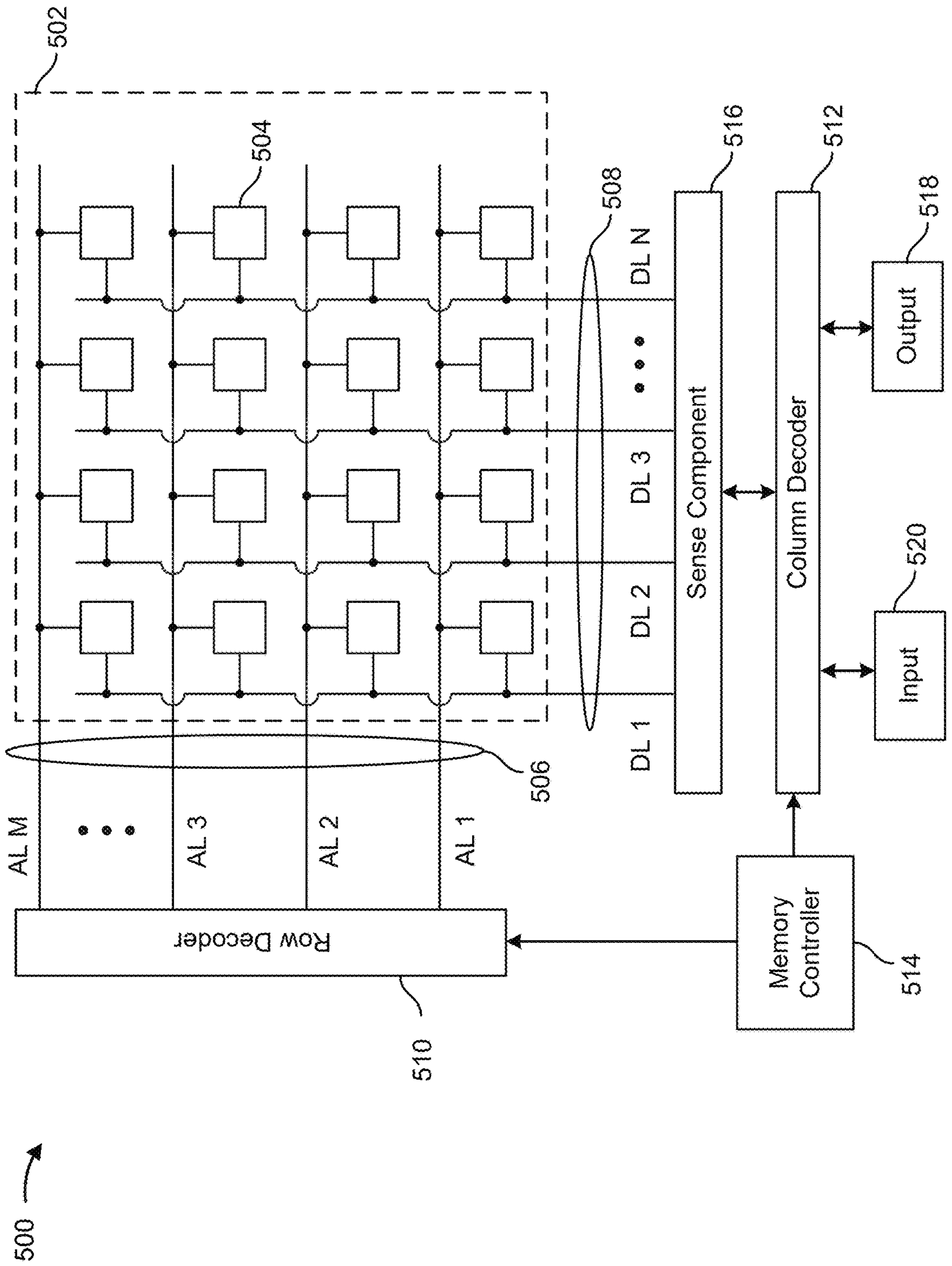
FIG. 5 is a diagrammatic view of an example memory device.

FIG. 5 is a diagrammatic view of an example memory device 500. The memory device 500 may include a memory array 502 that includes multiple memory cells 504. A memory cell 504 is programmable or configurable into a data state of multiple data states (e.g., two or more data states). For example, a memory cell 504 may be set to a particular data state at a particular time, and the memory cell 504 may be set to another data state at another time. A data state may correspond to a value stored by the memory cell 504. The value may be a binary value, such as a binary 0 or a binary 1, or may be a fractional value, such as 0.5, 1.5, or the like. A memory cell 504 may include a capacitor to store a charge representative of the data state. For example, a charged and an uncharged capacitor may represent a first data state and a second data state, respectively. As another example, a first level of charge (e.g., fully charged) may represent a first data state, a second level of charge (e.g., fully discharged) may represent a second data state, a third level of charge (e.g., partially charged) may represent a third data state, and so on.

Operations such as reading and writing (i.e., cycling) may be performed on memory cells 504 by activating or selecting the appropriate access line 506 (shown as access lines AL 1 through AL M) and digit line 508 (shown as digit lines DL 1 through DL N). An access line 506 may also be referred to as a “row line” or a “word line,” and a digit line 508 may also be referred to a “column line” or a “bit line.” Activating or selecting an access line 506 or a digit line 508 may include applying a voltage to the respective line. An access line 506 and/or a digit line 508 may comprise, consist of, or consist essentially of a conductive material, such as a metal (e.g., copper, aluminum, gold, titanium, or tungsten) and/or a metal alloy, among other examples. In FIG. 5, each row of memory cells 504 is connected to a single access line 506, and each column of memory cells 504 is connected to a single digit line 508. By activating one access line 506 and one digit line 508 (e.g., applying a voltage to the access line 506 and digit line 508), a single memory cell 504 may be accessed at (e.g., is accessible via) the intersection of the access line 506 and the digit line 508. The intersection of the access line 506 and the digit line 508 may be called an "address" of a memory cell 504.

In some implementations, the logic storing device of a memory cell 504, such as a capacitor, may be electrically isolated from a corresponding digit line 508 by a selection component, such as a transistor. The access line 506 may be connected to and may control the selection component. For example, the selection component may be a transistor, and the access line 506 may be connected to the gate of the transistor. Activating the access line 506 results in an electrical connection or closed circuit between the capacitor of a memory cell 504 and a corresponding digit line 508. The digit line 508 may then be accessed (e.g., is accessible) to either read from or write to the memory cell 504.

A row decoder 510 and a column decoder 512 may control access to memory cells 504. For example, the row decoder 510 may receive a row address from a memory controller 514 and may activate the appropriate access line 506 based on the received row address. Similarly, the column decoder 512 may receive a column address from the memory controller 514 and may activate the appropriate digit line 508 based on the column address.

Upon accessing a memory cell 504, the memory cell 504 may be read (e.g., sensed) by a sense component 516 to determine the stored data state of the memory cell 504. For example, after accessing the memory cell 504, the capacitor of the memory cell 504 may discharge onto its corresponding digit line 508. Discharging the capacitor may be based on biasing, or applying a voltage, to the capacitor. The discharging may induce a change in the voltage of the digit line 508, which the sense component 516 may compare to a reference voltage (not shown) to determine the stored data state of the memory cell 504. For example, if the digit line 508 has a higher voltage than the reference voltage, then the sense component 516 may determine that the stored data state of the memory cell 504 corresponds to a first value, such as a binary 1. Conversely, if the digit line 508 has a lower voltage than the reference voltage, then the sense component 516 may determine that the stored data state of the memory cell 504 corresponds to a second value, such as a binary 0. The detected data state of the memory cell 504 may then be output (e.g., via the column decoder 512) to an output component 518 (e.g., a data buffer). A memory cell 504 may be written (e.g., set) by activating the appropriate access line 506 and digit line 508. The column decoder 512 may receive data, such as input from input component 520, to be written to one or more memory cells 504. A memory cell 504 may be written by applying a voltage across the capacitor of the memory cell 504.

The memory controller 514 may control the operation (e.g., read, write, re-write, refresh, and/or recovery) of the memory cells 504 via the row decoder 510, the column decoder 512, and/or the sense component 516. The memory controller 514 may generate row address signals and column address signals to activate the desired access line 506 and digit line 508. The memory controller 514 may also generate and control various voltages used during the operation of the memory array 502.

As indicated above, FIG. 5 is provided as an example. Other examples may differ from what is described with respect to FIG. 5.

Figure 6:
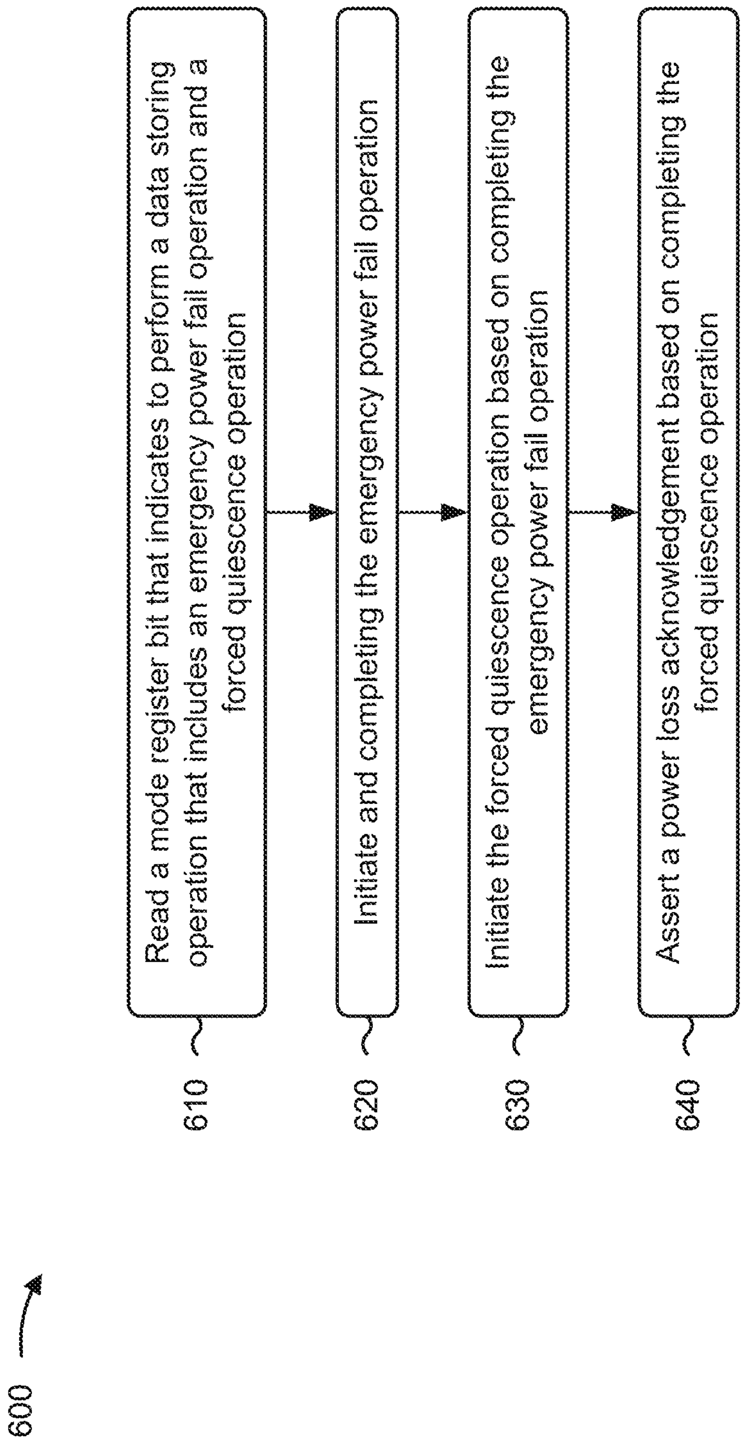
FIG. 6 is a flowchart of an example method associated with emergency data storing operation selection.

FIG. 6 is a flowchart of an example method 600 associated with a two-stage emergency data storing operation. In some implementations, a memory device (e.g., the memory device 120) may perform or may be configured to perform the method 600. In some implementations, another device or a group of devices separate from or including the memory device (e.g., the system 100) may perform or may be configured to perform the method 600. Additionally, or alternatively, one or more components of the memory device (e.g., the controller 130, the memory management component 225, emergency power fail component 230, forced quiescence component 235, and/or emergency storing component 240) may perform or may be configured to perform the method 600. Thus, means for performing the method 600 may include the memory device and/or one or more components of the memory device. Additionally, or alternatively, a non-transitory computer-readable medium may store one or more instructions that, when executed by the memory device (e.g., the controller 130 of the memory device 120), cause the memory device to perform the method 600.

As shown in FIG. 6, the method 600 may include reading a mode register bit that indicates to perform a data storing operation that includes an emergency power fail operation and a forced quiescence operation (block 610). As further shown in FIG. 6, the method 600 may include initiating and completing the emergency power fail operation (block 620). As further shown in FIG. 6, the method 600 may include initiating the forced quiescence operation based on completing the emergency power fail operation (block 630). As further shown in FIG. 6, the method 600 may include asserting a power loss acknowledgement based on completing the forced quiescence operation (block 640).

The method 600 may include additional aspects, such as any single aspect or any combination of aspects described below and/or described in connection with one or more other methods or operations described elsewhere herein.

In a first aspect, a first state of the mode register bit indicates for the memory device to perform the data storing operation that includes the emergency power fail operation and the forced quiescence operation, and a second state of the mode register bit indicates for the memory device to perform a data storing operation that includes only one of the emergency power fail operation or the forced quiescence operation.

In a second aspect, alone or in combination with the first aspect, the method 600 includes detecting a power loss condition or a standard shut-down condition of the memory device, wherein reading the mode register bit comprises reading the mode register bit based on detecting the power loss condition or the standard shut-down condition of the memory device.

In a third aspect, alone or in combination with one or more of the first and second aspects, the power loss condition is associated with a low battery condition or a disconnected battery condition.

In a fourth aspect, alone or in combination with one or more of the first through third aspects, initiating and completing the emergency power fail operation, and initiating the forced quiescence operation, comprises initiating and completing the emergency power fail operation, and initiating the forced quiescence operation, using power received from one or more capacitors associated with the memory device.

In a fifth aspect, alone or in combination with one or more of the first through fourth aspects, asserting the power loss acknowledgement comprises transmitting a power loss acknowledgement signal to a power management component.

In a sixth aspect, alone or in combination with one or more of the first through fifth aspects, transmitting the power loss acknowledgement signal comprises transmitting the power loss acknowledgement signal to the power management component based on completing the emergency power fail operation and the forced quiescence operation.

In a seventh aspect, alone or in combination with one or more of the first through sixth aspects, the method 600 includes performing a controller level reset or de-asserting a power loss notification signal based on completing the emergency power fail operation and the forced quiescence operation.

Although FIG. 6 shows example blocks of a method 600, in some implementations, the method 600 may include additional blocks, fewer blocks, different blocks, or differently arranged blocks than those depicted in FIG. 6. Additionally, or alternatively, two or more of the blocks of the method 600 may be performed in parallel. The method 600 is an example of one method that may be performed by one or more devices described herein. These one or more devices may perform or may be configured to perform one or more other methods based on operations described herein.

In some implementations, a memory device includes one or more components configured to: detect a power loss notification signal that indicates a power loss condition of the memory device; read a mode register bit of the memory device that indicates to perform a data storing operation that includes a first data storing stage and a second data storing stage, wherein the first data storing stage includes storing data associated with the memory device prior to the memory device experiencing a power loss, and the second data storing stage includes storing data and metadata associated with the memory device prior to the memory device experiencing the power loss; initiate the data storing operation; and selectively acknowledge the power loss condition based on completing the first data storing stage or the second data storing stage.

In some implementations, a system includes a power management component configured to: detect a power loss condition associated with a memory device; and transmit a power loss notification signal to the memory device that indicates the power loss condition; and the memory device, wherein the memory device is configured to: receive the power loss notification signal; read a mode register bit of the memory device that indicates to perform a data storing operation that includes a first data storing stage and a second data storing stage, wherein the first data storing stage includes storing data associated with the memory device prior to the memory device experiencing a power loss, and the second data storing stage includes storing data and metadata associated with the memory device prior to the memory device experiencing the power loss; initiate the data storing operation; and selectively acknowledge the power loss condition based on completing the first data storing stage or the second data storing stage.

In some implementations, a method performed by a memory device includes detecting a power loss condition of the memory device; reading a mode register bit that indicates to perform a data storing operation that includes an emergency power fail operation and a forced quiescence operation; initiating and completing the emergency power fail operation; initiating the forced quiescence operation based on completing the emergency power fail operation; and asserting a power loss acknowledgement based on completing the forced quiescence operation.

The foregoing disclosure provides illustration and description but is not intended to be exhaustive or to limit the implementations to the precise forms disclosed. Modifications and variations may be made in light of the above disclosure or may be acquired from practice of the implementations described herein.

Even though particular combinations of features are recited in the claims and/or disclosed in the specification, these combinations are not intended to limit the disclosure of implementations described herein. Many of these features may be combined in ways not specifically recited in the claims and/or disclosed in the specification. For example, the disclosure includes each dependent claim in a claim set in combination with every other individual claim in that claim set and every combination of multiple claims in that claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Where only one item is intended, the phrase "only one," "single," or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. As used herein, the term "multiple" can be replaced with "a plurality of" and vice versa. Also, as used herein, the term "or" is intended to be inclusive when used in a series and may be used interchangeably with "and/or," unless explicitly stated otherwise (e.g., if used in combination with "either" or "only one of").

What is claimed is:

1. A memory device, comprising:

one or more components configured to:

read a mode register bit of the memory device, wherein a first state of the mode register bit indicates to perform a first data storing operation that includes a first stage and a second stage, wherein a second state of the mode register bit indicates to perform a second data storing operation that includes only one of the first stage or the second stage, and wherein the first stage includes storing data prior to the memory device experiencing a power loss, and the second stage includes storing data and metadata prior to the memory device experiencing the power loss; and initiate the first data storing operation or the second data storing operation based on the mode register bit.

2. The memory device of claim 1, wherein the first stage includes an emergency power fail operation and the second stage includes a forced quiescence operation.

3. The memory device of claim 1, wherein the one or more components are further configured to:

detect a power loss notification signal that indicates a power loss condition of the memory device, wherein reading the mode register bit is based on detecting the power loss notification signal.

4. The memory device of claim 1, wherein, when the mode register bit is in the second state, the one or more components are further configured to:

read an additional mode register bit, wherein a first state of the additional mode register bit indicates that the first stage is enabled, and wherein a second state of the additional mode register bit indicates that the second stage is enabled.

5. The memory device of claim 4, wherein the one or more components are further configured to:

initiate the second data storing operation including the first stage or the second stage based on the mode register bit and the additional mode register bit.

6. The memory device of claim 1, wherein, when the mode register bit is in the first state, the one or more components are further configured to:

perform the first stage of the first data storing operation; and initiate the second stage of the first data storing operation based on completing the first stage prior to a first time and based on having enough power to continue with the second stage.

7. The memory device of claim 1, wherein the one or more components are configured to perform the first data storing operation or the second data storing operation using power received from one or more capacitors associated with the memory device.

8. The memory device of claim 1, wherein the one or more components are configured to perform the first data storing operation or the second data storing operation using one or more voltages that supply power to the memory device.

9. A system, comprising:

a power component configured to transmit a signal, to a memory device, that indicates a power loss condition; and the memory device, wherein the memory device is configured to:

read, based on the signal, a mode register bit of the memory device, wherein a first state of the mode register bit indicates to perform a first data storing operation that includes a first stage and a second stage, wherein a second state of the mode register bit indicates to perform a second data storing operation that includes only one of the first stage or the second stage, and wherein the first stage includes storing data prior to the memory device experiencing a power loss, and the second stage includes storing data and metadata prior to the memory device experiencing the power loss; and initiate the first data storing operation or the second data storing operation based on the mode register bit and the signal.

10. The system of claim 9, wherein the first stage includes an emergency power fail operation and the second stage includes a forced quiescence operation.

11. The system of claim 9, wherein, when the mode register bit is in the second state, the memory device is further configured to:

read an additional mode register bit, wherein a first state of the additional mode register bit indicates that the first stage is enabled, and wherein a second state of the additional mode register bit indicates that the second stage is enabled.

12. The system of claim 11, wherein the memory device is further configured to:

initiate the second data storing operation including the first stage or the second stage based on the mode register bit and the additional mode register bit.

13. The system of claim 9, wherein, when the mode register bit is in the first state, the memory device is further configured to:

perform the first stage of the first data storing operation; and initiate the second stage of the first data storing operation based on completing the first stage prior to a first time.

14. A method performed by a memory device, comprising:

reading a mode register bit, wherein a first state of the mode register bit indicates to perform a first data storing operation that includes a first stage and a second stage, wherein a second state of the mode register bit indicates to perform a second data storing operation that includes only one of the first stage or the second stage, and wherein the first stage includes storing data prior to the memory device experiencing a power loss, and the second stage includes storing data and metadata prior to the memory device experiencing the power loss; and initiating the first data storing operation or the second data storing operation based on the mode register bit.

15. The method of claim 14, wherein the first stage includes an emergency power fail operation and the second stage includes a forced quiescence operation.

16. The method of claim 14, further comprising detecting a power loss condition or a standard shut-down condition of the memory device, wherein reading the mode register bit comprises reading the mode register bit based on detecting the power loss condition or the standard shut-down condition of the memory device.

17. The method of claim 14, further comprising detecting a power loss notification signal that indicates a power loss condition of the memory device, wherein reading the mode register bit is based on detecting the power loss notification signal.

18. The method of claim 14, wherein the mode register bit is in the second state, the method further comprising:

reading an additional mode register bit, wherein a first state of the additional mode register bit indicates that the first stage is enabled, and wherein a second state of the additional mode register bit indicates that the second stage is enabled.

19. The method of claim 14, wherein the first data storing operation or the second data storing operation is performed using power received from one or more capacitors associated with the memory device.

20. The method of claim 14, wherein the first data storing operation or the second data storing operation is performed using one or more voltages that supply power to the memory device.

* * * * *